United States Patent [19]

Sliney et al.

[11] Patent Number: 5,034,187
[45] Date of Patent: Jul. 23, 1991

[54] METHOD OF MAKING CARBIDE/FLUORIDE/SILVER COMPOSITES

[75] Inventors: Harold E. Sliney, Parma; Christopher Dellacorte, Medina, both of Ohio

[73] Assignee: The United States of America as represented by the Administrator of the National Aeronautics and Space Administration, Washington, D.C.

[21] Appl. No.: 571,058

[22] Filed: Aug. 23, 1990

[51] Int. Cl.[5] .............................................. B22F 32/00
[52] U.S. Cl. ........................................ 419/14; 419/30; 419/32; 419/36; 419/38; 419/39; 419/49; 419/54; 419/50; 419/57; 419/58; 419/69
[58] Field of Search ...................... 419/14, 30, 32, 36, 419/38, 39, 49, 54, 58, 50, 69, 57

[56] References Cited

U.S. PATENT DOCUMENTS

| | | | |
|---|---|---|---|
| 2,313,070 | 12/1942 | Hensel et al. | 75/136 |
| 2,852,367 | 8/1954 | Goetzel et al. | 75/201 |
| 2,875,510 | 3/1959 | Wagner et al. | 29/182.5 |
| 2,998,641 | 9/1961 | Atkinson et al. | 29/182.5 |
| 3,755,164 | 8/1973 | Van Wyk | 252/12 |
| 3,790,239 | 12/1974 | Laux et al. | 308/307 |
| 3,929,396 | 12/1975 | Orkin et al. | 308/241 |
| 4,728,448 | 3/1988 | Sliney | 252/12.2 |

Primary Examiner—Stephen J. Lechert, Jr.
Assistant Examiner—Nina Bhat
Attorney, Agent, or Firm—Gene E. Shook; John R. Manning; James A. Mackin

[57] ABSTRACT

A composition containing 30 to 70% chromium carbide, 5 to 20% soft noble metal, 5 to 20% metal fluorides, and 20 to 60% metal binder is used in a powdered metallurgy process for the production of self-lubricating components, such as bearings. The use of the material allows the self-lubricating bearing to maintain its low friction properties over an extended range of operating temperatures.

19 Claims, 1 Drawing Sheet

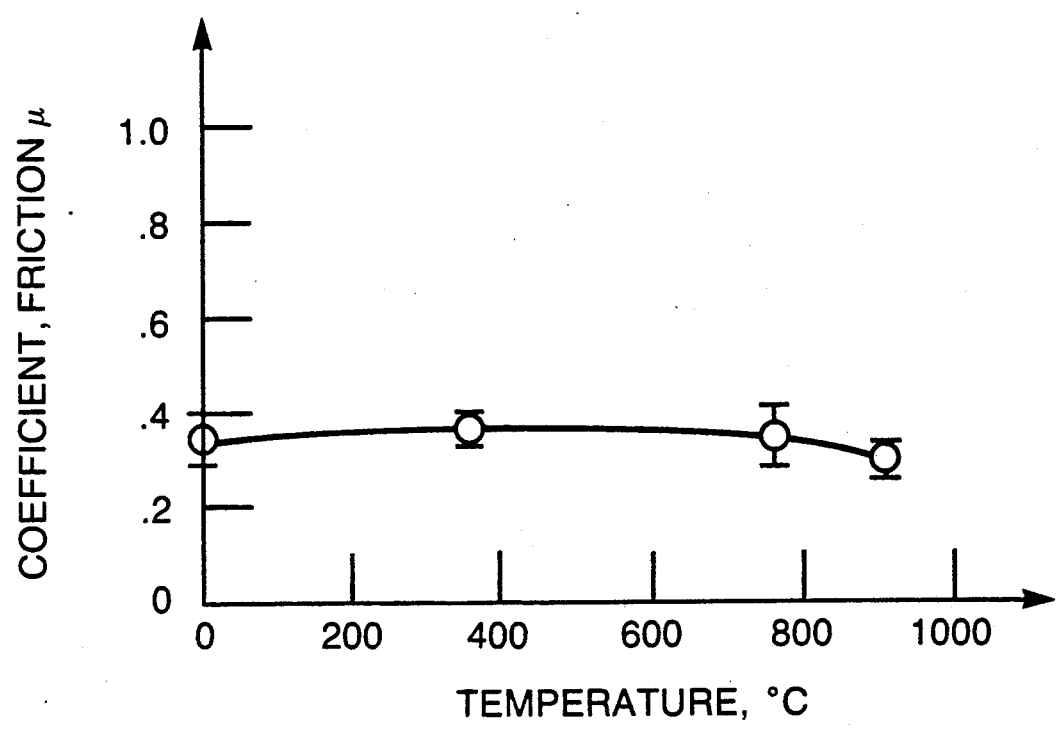

METHOD OF MAKING CARBIDE/FLUORIDE/SILVER COMPOSITES

ORIGIN OF THE INVENTION

The invention described herein was made by employees of the United States Government and may be manufactured and used by and for the Government for governmental purposes without the payment of any royalties thereon or therefor.

TECHNICAL FIELD

This invention is concerned with a method for making a composite material which exhibits low friction and wear over a wide temperature range. This invention is particularly directed to powder metallurgical processes for preparing this material.

Carbide/fluoride/silver self-lubricating composite materials were described in the prior art in U.S. Pat. No. 4,728,448. That patent describes several satisfactory material compositions and general preparation methods with emphasis on plasma spraying.

The prior art plasma spraying of these materials has produced quality coatings with improved lubricating properties. However, it has been found that quality control procedures required to assure satisfactory coatings by plasma spraying are critical and difficult. Also plasma spraying, while capable of producing useful coatings, is not suitable for making free standing parts.

It is, therefore, an object of the present invention to provide powder metallurgical processes for producing free standing components such as bearings, bushings, valve seats, and gears.

A further object of the invention is to provide improved processes for making self-lubricating materials which exhibit low friction and wear over a wide temperature range in the absence of any supplemental external lubrication by oil, grease, or solid lubricants.

A still further object of the invention is to provide powder metallurgical processes for producing self-lubricated bearing and seal materials which are satisfactory for operation at temperatures from 25° C. or lower to 900° C.

Another object of the invention is to provide powder metallurgical processes for producing self-lubricated materials that are satisfactory in oxidizing atmospheres, such as air, and reducing atmospheres, such as hydrogen, at high temperatures.

BACKGROUND ART

U.S. Pat. No. 2,313,070 to Hensel et al is concerned with a composition which is used in making an electrical contact. U.S. Pat. No. 2,852,367 to Goetzel et al is directed to a heat resistant material comprising carbides, borides and hafnium.

U.S. Pat. No. 2,875,510 to Wagner describes a bearing composition for producing bearings of a powdered material. U.S. Pat. No. 2,998,461 to Atkinson et al is directed to the combination of a carbide with a nobel metal in a powdered metallurgy composition. U.S. Pat. No. 3,929,396 to Orkin discloses a molded plastic bearing assembly.

DISCLOSURE OF THE INVENTION

This invention is directed to a composition containing in percents by weight about 20% to about 70% chromium carbide, about 5% to about 50% soft noble metal, about 5% to about 20% metal fluorides, and about 20% to about 60% metal binder. Several powder metallurgical processes are used for the production of self-lubricating components having compositions in these ranges.

The powder metallurgical processes of the present invention are used to produce self-lubricating bearings which maintain their low friction properties over an extended range of operating temperatures. These self-lubricating materials can be used at these temperatures in oxidizing and reducing atmospheres.

BRIEF DESCRIPTION OF THE DRAWINGS

The foregoing, as well as other objects, features, and advantages of the invention will become more apparent from the following detailed description when taken in conjunction with the drawing which is a graph showing the friction coefficient of a material prepared in accordance with the present invention plotted against temperature.

BEST MODE FOR CARRYING OUT THE INVENTION

Powders of chromium carbide, a metal binder, a soft noble metal and chemically stable fluoride salts are blended in the desired proportions. Powder metallurgy parts produced in accordance with the present invention contain about 20 weight percent to about 70 weight percent of an oxidation resistant carbide, such as chromium carbide or hafnium carbide. The products further contain from about 5 weight percent to about 50 weight percent soft noble metal, such as silver or gold.

The powder metallurgy parts further contain from about 5 weight percent to about 20 weight percent metal fluorides. These fluorides can be from group I, group II, or rare earth metals, or mixtures thereof. The parts fabricated from powder metallurgy in accordance with the present invention further contains from about 20 weight percent to about 60 weight percent metal binder. The metal in the binder is an alloy of nickel, cobalt or a mixture thereof.

After the powders of the components have been blended they are consolidated to form the composite material. This consolidation is accomplished by mechanical pressing in a die, cold isostatic pressing, or rolling followed by heating either by sintering in a non-oxidizing atmosphere or by hot pressing.

More particularly, the powders are consolidated by cold isostatic pressing at a temperature of about 25° C. and a pressure between about 40 Ksi and about 80 Ksi. This is followed by sintering at a temperature between about 900° C. to about 1200° C. for about 10 to 30 minutes. The sintering is performed in hydrogen or inert gas at a pressure of one atmosphere. In another preferred embodiment, cold isostatic pressing is followed by hot isostatic pressing at a temperature between about 900° C. and about 1200° C. and a pressure between about 20 Ksi and about 60 Ksi. In still another embodiment the blended powders are hot isostatically pressed, hot mechanically pressed, or hot rolled without prior cold compaction at a temperature between about 900° C. and about 1200° C. and a pressure between about 20 Ksi and about 60 Ksi. However, with this single step method it is more difficult to obtain near final shape parts.

The consolidated powders may then be densified to produce the finished part. This densification can be accomplished by sizing, coining, or hot rolling. This step is often not required after hot pressing which usually produces fully-dense parts.

In order to illustrate the beneficial technical effects of the invention, blended powders were poured into a steel die and cold pressed at 8 Ksi. The resulting compact was then carefully placed in a rubber bag and cold isostatically pressed at 60 Ksi. The green compact, which was about 70% dense, was weighed and measured and then sintered in a hydrogen atmosphere at 1100° C. for 20 minutes. Heating and cooling rates were constant at 10° C./minute.

The sintered slug had a measured bulk density of about 80%. Liquid porosimetry was done on some samples which indicated that approximately one-third of the remaining porosity was open. The sintering resulted in densification, but there were little or no chemical reactions between phases.

The sintered slugs were approximately 10 mm in diameter and 25 mm long. To make the wear pin specimens, the slugs were rough machined to an outside diameter of 9.5 mm with a tungsten carbide tool bit. Water was used as grinding lubricant/coolant to prevent contamination of the parts. The ends of the pin were then diamond ground to a radius of 4.76 mm.

Following the machining, the pins are preferably heat treated in $H_2$ containing a small amount of water vapor at 900° C. for 60 minutes to help bring more fluoride lubricant to the machined surface. The fluorides have a tendency to migrate to the surface at elevated temperatures.

The specimens were tested in a pin-on-disk tribometer. With this configuration, hemispherically tipped pins of a composite material made in accordance with the invention were placed in sliding contact against disks made from a precipitation hardened nickel cobalt chromium superalloy having a hardness of RC 38 to 40 at room temperature.

The pins generated 51 mm diameter wear tracks on the disk. Sliding was unidirectional at 0.27 to 5 m/sec and loads of 0.5 to 3.0 kg were applied with deadweights. Most of the tests were done at 2.7 m/sec sliding velocity and 0.5 kg load so that direct comparisons of the data could be made to previous tests. The disks were heated with a low frequency induction heater. Temperature was measured with an infrared pyrometer capable of measuring surface temperatures from 100° C. to 1400° C.±5%. The test atmosphere was air with a relative humidity of 35% at 25° C.. In general, tests were run for 30 minutes, then the specimens were removed from the rig and wear measurements were made. A relocation dowel on the specimen holder allowed for accurate replacement of the specimens.

The friction and wear results are given in the table and graphed in the drawing. The friction and wear of the composite/metal couple are similar to results obtained previously with similar coatings on a metal disk sliding against a metal pin.

| TEMPERATURE, °C. | LOAD, kg | FRICTION COEFFICIENT, μ |
|---|---|---|
| 850 | 0.5 | 0.29 ± 0.03 |
| 760 | 0.5 | 0.35 ± 0.06 |
| 350 | 0.5 | 0.38 ± 0.02 |
| 25 | 0.5 | 0.35 ± 0.05 |

The friction for the pins sliding against the disks ranges from 0.29±0.03 at 850° C. to 0.35±0.5 at 25° C. Wear lower at 760° C. to 850° C. than at 25° C. and 350° C., but are well within the moderate to low range.

ALTERNATE EMBODIMENTS OF THE INVENTION

It is contemplated that the consolidation of the powders may be accomplished by several other processes in sequence. More particularly, the blended powders can be consolidated by cold mechanical pressing at 5 Ksi to 80 Ksi at 25° C. and then hot isostatically pressed at 900° C. to 1200° C. at 20 Ksi to 60 Ksi.

The blended powders may be consolidated by first cold mechanical pressing at the aforementioned temperatures and pressures followed by the preferred cold isostatic pressing and sintering as set forth above. Still another process for consolidation is a single hot mechanical pressing at 900° C. to 1200° C. This hot pressing is carried out at 20 Ksi to 60 Ksi in hydrogen or an inert gas environment.

The blended powders may be cold rolled followed by sintering at 900° C. to 1200° C. for ten to thirty minutes. This sintering is carried out in hydrogen or inert gas environment.

While several embodiments of the invention have been described, it will be appreciated that various procedural modifications may be made to the invention without departing from the spirit thereof or the scope of the subjoined claims. By way of example, the aforementioned range of parameters may be extended. It is contemplated that higher mechanical and isostatic pressures may be used where equipment with high pressure capabilities is available.

From the aforementioned description, it is apparent that the powdered metallurgy processes of the present invention and the plasma spray processes of the prior art each have their own advantages depending on the intended application. The powder metallurgy processes of the present invention have the advantage of producing entire parts, while the plasma spray processes are only suitable for producing coatings.

In addition, there is very little waste with the powdered metallurgy process of the present invention. More particularly, very little material is lost during the powder metallurgy processing, while much material can be lost by overspray during plasma spray processes. This is especially important when precious metals, such as gold and silver, are among the components.

Also, composition control of the final product is easier by powder metallurgy processes because none of the components of the blended powders is selectively lost. In the spray process great care is required to achieve the desired composition because of the different deposit efficiencies of the various components.

We claim:

1. A method of making a free standing product from components of a self-lubricating, friction and wear reducing composite material consisting essentially of about 20–70% by weight carbide, about 5–50% by weight soft noble metal, about 5–20% by weight flurodies, and about 20–60% by weight metal binder, said method comprising the steps of
   blending powders of said components in said composite range,
   cold compacting said blended powders thereby forming said composite material, and
   heating said composite material thereby forming said free standing product.

2. A method of making a composite material as claimed in claim 1 wherein the blended powders are first cold compacted and then sintered.

3. A method of making a composite material as claimed in claim 2 wherein the blended powders are cold compacted by cold mechanical pressing.

4. A method of making a composite material as claimed in claim 3 wherein the blended powders are cold mechanically pressed at a temperature of about 25° C. and a pressure between about 5 Ksi to about 80 Ksi.

5. A method of making a composite material as claimed in claim 2 wherein the blended powders are cold compacted by cold isostatic pressing.

6. A method of making a composite material as claimed in claim 5 wherein the blended powders are cold isostatically pressed at a temperature of about 25° C. and a pressure between about 40 Ksi to about 80 Ksi.

7. A method of making a composite material as claimed in claim 2 wherein the cold compacted powders are sintered at a temperature of about 900° C. to about 1200° C. for about ten minutes to about thirty minutes in a gas at a pressure of about one atmosphere.

8. A method of making a composite material as claimed in claim 7 wherein the cold compacted powders are sintered in an inert gas.

9. A method of making a composite material as claimed in claim 7 wherein the cold compacted powders are sintered in hydrogen gas.

10. A method of making a composite material as claimed in claim 1 wherein the blended powders are first cold compacted and then hot pressed.

11. A method of making a composite material as claimed in claim 10 wherein the blended powders are cold compacted by cold mechanical pressing.

12. A method of making a composite material as claimed in claim 11 wherein the blended powders are cold mechanically pressed at a temperature of about 25° C. and a pressure between about 5 Ksi to about 80 Ksi.

13. A method of making a composite material as claimed in claim 10 wherein the blended powders are cold compacted by cold isostatic pressing.

14. A method of making a composite material as claimed in claim 13 wherein the blended powders are cold isostatically pressed at a temperature of about 25° C. and a pressure between 40 Ksi to about 80 Ksi.

15. A method of making a composite material as claimed in claim 10 wherein the cold compacted powders are hot isostatically pressed at a temperature between about 900° C. to about 1200° C. at a pressure of about 20 Ksi to about 60 Ksi.

16. A method of making a composite material as claimed in claim 2 wherein the blended powders are cold compacted by cold rolling.

17. A method of making a composite material as claimed in claim 16 wherein the compacted powders are sintered at a temperature between about 900° C. to about 1200° C. for about 10 to about 30 minutes at about one atmosphere in a gas.

18. A method of making a composite material as claimed in claim 17 wherein the compacted powders are sintered in a inert gas.

19. A method of making a composite material as claimed in claim 17 wherein the compacted powders are sintered in hydrogen gas.

* * * * *

UNITED STATES PATENT AND TRADEMARK OFFICE
CERTIFICATE OF CORRECTION

PATENT NO. : 5,034,187

DATED : July 23, 1991

INVENTOR(S) : Harold E. Sliney and Christopher Dellacorte

It is certified that error appears in the above-identified patent and that said Letters Patent is hereby corrected as shown below:

Column 4, lines 60 and 61, cancel "fluro-dies" and insert --fluorides

Signed and Sealed this

First Day of December, 1992

Attest:

DOUGLAS B. COMER

Attesting Officer

Acting Commissioner of Patents and Trademarks